United States Patent [19]

Samish

[11] Patent Number: 4,848,995
[45] Date of Patent: Jul. 18, 1989

[54] REMOVAL OF SULFUR OXIDES FROM FLUE GAS

[75] Inventor: Norman C. Samish, Houston, Tex.

[73] Assignee: Shell Oil Company, Houston, Tex.

[21] Appl. No.: 152,735

[22] Filed: Feb. 5, 1988

[51] Int. Cl.[4] ............................................. F25J 3/00
[52] U.S. Cl. ........................................ 62/20; 110/216; 110/345; 423/242
[58] Field of Search ............... 110/341, 342, 343, 344, 110/345, 347, 216, 215; 62/20, 121; 423/242, 244 R, 244 A

[56] References Cited

U.S. PATENT DOCUMENTS

| | | | |
|---|---|---|---|
| 3,837,820 | 9/1974 | Kukin | 110/343 X |
| 4,078,390 | 3/1978 | Duvall | 62/11 |
| 4,491,461 | 1/1985 | Hoekstra | 62/20 X |
| 4,509,436 | 4/1985 | Schrofelbauer et al. | 110/34 S |
| 4,590,049 | 5/1986 | Staudinger | 110/345 X |
| 4,704,972 | 11/1987 | Marchard | 110/34 S |

*Primary Examiner*—Ronald C. Capossela

[57] ABSTRACT

A method of removing sulfur oxides from flue gas produced by the combustion of a fuel to produce a flue gas containing sulfur oxides and water comprising contacting the moist flue gas with hydrated alkaline earth metal hydroxide particles having a temperature sufficiently low to condense the water vapor present in the flue gas onto the particles and recovering a flue gas reduced in sulfur oxides.

10 Claims, 1 Drawing Sheet

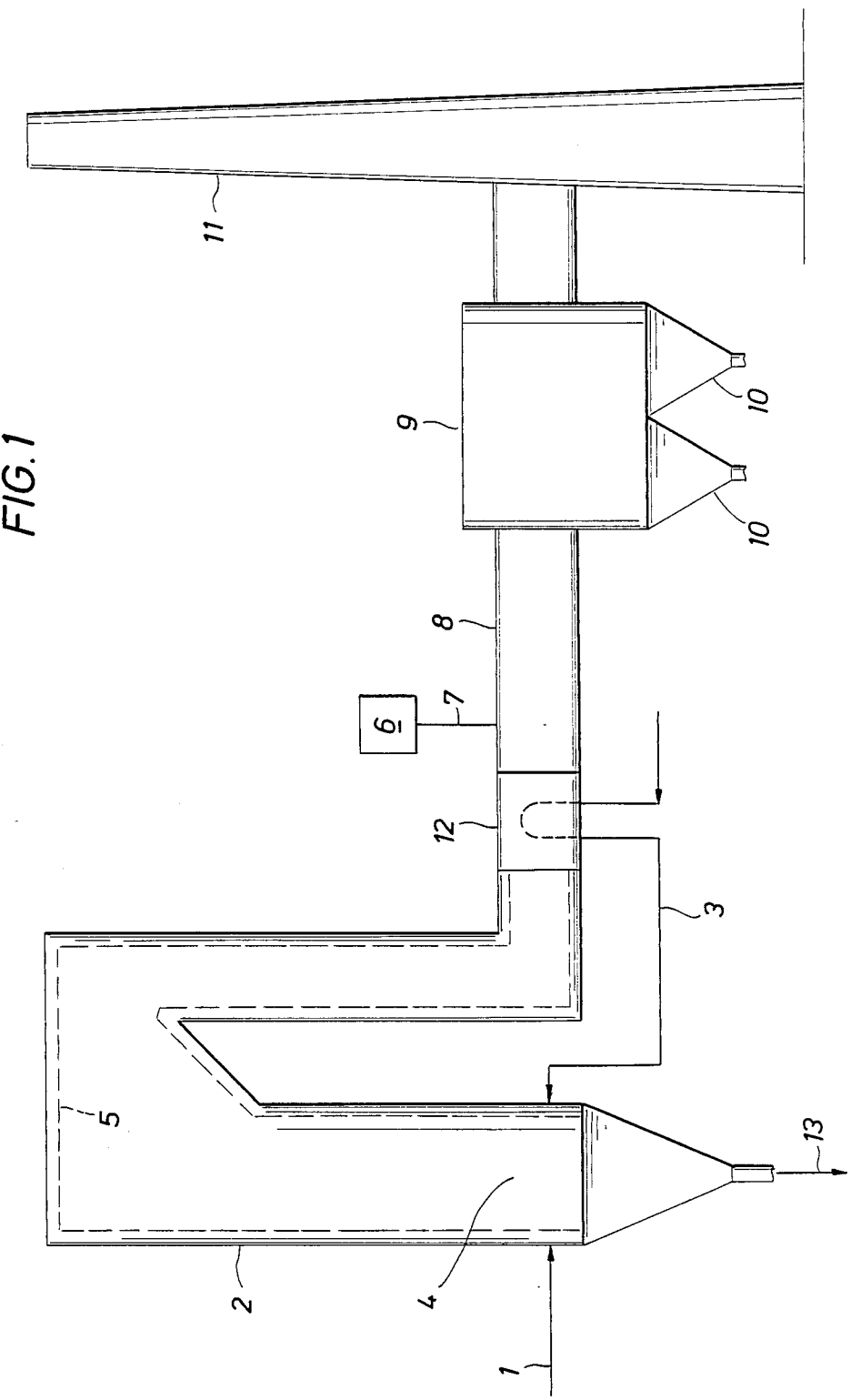

REMOVAL OF SULFUR OXIDES FROM FLUE GAS

BACKGROUND OF THE INVENTION

1. Field of the Invention

The present invention is related to a process for the removal of sulfur oxides from flue gas.

2. State of the Art

An economical method of removing sulfur dioxide, $SO_2$, from flue gases consists of injecting calcium hydroxide crystals, called hydrate, into flue gases at stack temperatures of about 300° F., and then injecting a water spray. The water droplets contact the $SO_2$, some of which dissolves forming $H_2SO_3$. The $H_2SO_3$ then contacts hydrate particles and reacts, forming $CaSO_3$ and water. A mixture of the $CaSO_3$ formed, unreacted hydrate and flyash is recovered in a downstream particulate-removal device, such as an electrostatic precipitator, baghouse or the like, and desulfurized flue gases are recovered or sent to a stack. A major drawback to this process is that large excess amounts of hydrate are used because much of the hydrate escapes unreacted when the $H_2SO_3$ evaporates before it contacts the hydrate particles, and reverts back to $SO_2$ and water vapor.

The object of the present invention is to increase the efficiency of the conversion of hydrate to $CaSO_3$ in flue gas desulfurization. This has the dual benefits of (a) removing more $SO_2$ per pound of hydrate injected, and (b) requiring less hydrate to be injected, thus reducing costs. The efficiency will be increased by cooling the hydrate before, or during, injections.

SUMMARY OF THE INVENTION

The present invention is directed to a method of removing sulfur oxides from flue gas, produced by the combustion of a fuel to produce a flue gas containing sulfur oxides and water vapor, comprising contacting the moist flue gas with hydrated alkaline earth metal hydroxide particles having a temperature sufficiently low to condense the water vapor present in the flue gas onto the particles and recovering a flue gas reduced in sulfur oxides.

The method of the present invention is useful to increase the efficiency of the conversion of hydrate to alkaline earth metal sulfur compounds and can result in (a) removing more oxides of sulfur per pound of hydrate injected, (b) less hydrate being injected, thus reducing costs, and (c) eliminating the necessity of injecting water into the moist flue gas. Since only the hydrate particles, not the moist flue gases, are cooled, a minimum of cooling energy is used to condense the water vapor in the moist flue gases directly onto the hydrate particles.

This cooling can be done before, during or after the hydrate injection. Any means of cooling can be used as long as it will cool the hydrate particles to a temperature sufficiently low that the water vapor in the moist flue gases can condense on the hydrate particles, typically less than 100° F. The cooling of hydrate particles in accordance with the invention provides a simple way of obtaining the condensation of water directly onto the particles for efficient reaction. Cooling the moist flue gases would not be effective since much more energy would be required to cool the large volume of moist flue gases.

The cooling can be done by injecting into the moist flue gases, hydrate particles that have been chilled, e.g., to about −320° F., by contact with liquid nitrogen or the like. Alternatively, hydrate particles and liquid nitrogen can be injected simultaneously and, as the liquid nitrogen evaporates, it will chill the hydrate particles. Alternatively, the hydrate particles can be chilled prior to injection by conventional refrigeration or other techniques known in the art for cooling particles.

When the chilled hydrate particles encounter the moist flue gases containing typically from about 10% to about 15% by volume of water vapor, at about 260° F., to about 400° F., preferably 270° F. to 330° F., the chilled particles will cause some of the water vapor in the flue gases to condense onto the particles. This condensed water will enable sulfur oxides ($SO_2$, $SO_3$) absorption by the water and ensure efficient subsequent reaction of the resulting sulfurous acid and the like with the core particle of hydrate. If insufficient water is present in the flue gases, additional water should be injected into the flue gases prior to the location of the injection of the hydrate particles so that sufficient water vapor is present to condense on the particles and react with sulfur oxides present in the hot flue gases.

The optimum injection point for chilled hydrate will be where the longest contact time can be achieved between a hydrate particle wetted with condensed water and sulfur oxides in the flue gas. If the hydrate particle is injected into flue gas that is too hot, the particle will rapidly become heated above the water evaporation temperature of about 212° F. and there will be little contact time between $SO_2$ and the wet particle. The optimum injection point for chilled hydrate will typically be just downstream of the heat exchanger that cools the gas to stack temperature, usually about 260° F. to 400° F., preferably 270° F. to 330° F.

The alkaline earth metal hydroxides used in the present invention include pure and impure compounds and combinations thereof, such as hydrated oxides of calcium and/or magnesium and the like. The forms of the alkaline earth metal hydroxides include fully hydrated high-calcium lime, such as dehydrated dolomitic lime and hydrated high-calcium lime, mixtures thereof and the like. Mixtures can include blends of individual forms of hydrated limes in any proportions and can include calcined and hydrated products of naturally occurring limestone materials which contain calcium and magnesium, such as dolomitic or magnesium limestone and the like. Calcium hydroxide [fully hydrated high-calcium lime, $Ca(OH)_2$] is preferred.

The amount of alkaline earth metal hydroxide used can vary as desired. For example, the mol ratio of the amount of alkaline earth metal hydroxide to sulfur oxides in the moist flue gases can be from about 1:10 to about 10:1 and is preferably from about 2:1 to about 1:2. The amount of any sulfur oxides in the effluent flue gases exiting from the process of the invention is controlled by the amount of cooled hydrate injected into the moist flue gases. Since the reaction is not usually stoichiometric, at least a slight excess of hydrate is generally used.

The reaction of the hydrate can be aided by the size of the particles. Small particles of, for example, one to five micron average size, can give better hydrate utilization than larger particles. On the other hand, larger particles can be less expensive than small particles, or can be needed to avoid premature heating above water evaporation temperature when injected. The optimum particle size will be a function of the characteristics of the injection location, required SO₂ removal, costs, etc.

The reaction is improved by providing sufficient means for the contact of the water vapor with the sulfur oxides and with the cooled hydrate particles. Preferably, there should be sufficient agitation in the system to insure that the chilled hydrate particles will come into contact with the moist flue gases under the reaction conditions necessary (1) to condense the water vapor onto the hydrate particles, (2) to react the sulfur oxides with the condensed water, and (3) to react the resulting sulfurous acid and the like with the alkaline earth metal hydroxide to form the alkaline earth metal sulfur compounds. Agitation is, at least in part, provided by the flow of the moist flue gases toward the dust collector and effluent stack. Additional agitation, if desired, can be provided by the injection of the cooled hydrate particles themselves into the moist flue gases. Further agitation can be provided when the hydrate particles are cooled by the injection into the moist flue gases of liquid nitrogen with the hydrate particles. Fixed or fluidized bed techniques and the like can also be used to provide contact between cooled hydrate particles and moist flue gases. If desired, additional agitation can be provided by conventional means known in the art for increasing the contact between gases and solids, such as passage through an induced-draft fan (equipment that is normally used in large boilers).

The furnace conditions used to combust a sulfur containing fuel to produce heat can vary with the type of furnace used and are not critical to the present invention. They need only be in the range that will provide for the formation of water vapor and sulfur oxides upon combustion of a sulfur containing fuel, such as coal, fuel oil or the like. The conventional furnace designs which are known in the art influence the composition of the flue gas for a particular sulfur content of a particular kind of fuel and the selection and operation is a matter of choice made by those in the art considering availability, economics and the like.

BRIEF DESCRIPTION OF THE DRAWING

In order to illustrate the invention with greater particularity, reference is made to the accompanying drawing.

FIG. 1 illustrates a schematic representation of a process for burning of sulfur-containing fuel in a furnace to generate heat and removing sulfur oxides from the resulting hot flue gases.

DETAILED DESCRIPTION OF THE DRAWING

With reference to FIG. 1, pulverized sulfur containing coal, is injected into a conventional furnace 2 via line 1. Sufficient oxygen, e.g., air, for combustion is injected into the furnace 2 via line 3. Combustion of the injected coal and oxygen takes place in the burner area 4 of the furnace resulting in flame temperatures of about 3000° F. to about 4000° F. Slag and/or bottom ash is removed at the bottom via 13. The resulting hot, moist flue gases containing sulfur oxides rise and pass through the furnace space, which is lined with heat exchange means 5. As the result of the combustion, heat and a variety of products are produced, including flyash, water vapor, sulfur oxides, such as sulfur dioxides and sulfur trioxide, and other products. These products remain in the hot flue gases as they continue passage and cool. After the moist flue gases containing sulfur oxides have contacted air pre-heater 12, they have a temperature in the range of from about 260° F. to about 400° F., preferably about 270° F. to about 330° F.

Hydrate particles [Ca(OH)₂] are chilled in chiller 6 by conventional refrigeration techniques known in the art for cooling solid materials, e.g., contact with liquid nitrogen. The cooled particles (−320° F.) are injected into the moist flue gases containing sulfur oxides via line 7. The mole ratio of hydrate to sulfur oxides is about 2:1 to about 1:2.

In one embodiment of the invention, the hydrate particles are chilled by forming a slurry thereof in liquid nitrogen or other material which will not solidify at the temperatures desired and injecting the slurry into the moist flue gases. In another embodiment the cooling liquid, e.g., liquid nitrogen, can be injected into the moist flue gases simultaneously with the particles. As the liquid nitrogen evaporates, the hydrate particles are cooled at about the same time as they come into contact with the moist flue gases containing sulfur oxides.

The chilled hydrate particles contact the moist flue gases and the water vapor contained in the flue gases condenses onto the chilled hydrate particles. This condensed water vapor dissolves the sulfur oxides in the hot flue gases forming the desired sulfurous or sulfuric acid. Because the water condenses onto the cooled hydrate particles, this ensures the most efficient reaction of the particles of hydrate with the sulfurous or sulfuric acid with the most efficient formation of calcium sulfite and/or calcium sulfate and water.

The desulfurized flue gases containing calcium sulfite and/or calcium sulfate pass via line 8 into a conventional dust collection device 9, such as baghouse, electrostatic and/or mechanical separator (filter) or the like to remove the calcium sulfite, and/or calcium sulfate excess hydrate particles, flyash and other undesired solids from the desulfurized flue gases. The fine solids, mainly flyash, are collected in the solids hopper 10 and the desulfurized flue gases pass upward out the effluent stack 11.

The furnaces, dust collectors and the sulfur containing fuels conventionally burned in the furnaces to produce heat, e.g., to heat fuel oils or to convert water into steam and the like, are well known in the art.

While the present invention has been illustrated with particular apparatus, those of skill in the art will appreciate that other equivalent or analogous units can be employed. The terms used to define the various apparatus include, where suitable, the use of segmented equipment operated in series, or the division of one unit into multiple units because of size constraints or the like.

What is claimed:

1. A method of removing sulfur oxides from flue gas produced by the combustion of a fuel to produce a flue gas containing sulfur oxides and water vapor comprising contacting the moist flue gas with particles consisting essentially of hydrated alkaline earth metal hydroxide said particles having a temperature sufficiently low to condense the water vapor present in the flue gas onto the particles, the condensed water dissolving the surface oxides contained in the flue gas forming acid which subsequently reacts with the hydrate particles forming alkaline earth metal sulfur compounds, removing the sulfur compounds and excess particles and recovering a flue gas reduced in sulfur oxides.

2. A process according to claim 1 wherein the alkaline earth metal hydroxide is calcium hydroxide, magnesium hydroxide or mixtures thereof.

3. A process according to claim 2 wherein the alkaline earth metal hydroxide is calcium hydroxide.

4. A process according to claim 1 wherein the hydrate is cooled prior to injection into the moist flue gases.

5. A process according to claim 1 wherein the hydrate is cooled by injecting hydrate particles and liquid nitrogen essentially simultaneously into the moist flue gases.

6. A process according to claim 1 wherein the moist flue gas has a temperature of 270° F. to 330° F.

7. A process according to claim 1 wherein the temperature of the particles is below 100° F.

8. A process according to claim 2 wherein the moist flue gas has a temperature of 260° F. to 400° F. and the particles temperature is below 100° F.

9. A process according to claim 8 wherein calcium hydroxide is used.

10. A process according to claim 9 wherein liquid nitrogen is used to cool the particles.

* * * * *